United States Patent [19]

Henry et al.

[11] Patent Number: 5,260,970
[45] Date of Patent: Nov. 9, 1993

[54] PROTOCOL ANALYZER POD FOR THE ISDN U-INTERFACE

[75] Inventors: Tim W. Henry; Paul S. Swanson, both of Colorado Springs, Colo.

[73] Assignee: Hewlett-Packard Company, Palo Alto, Calif.

[21] Appl. No.: 722,071

[22] Filed: Jun. 27, 1991

[51] Int. Cl.⁵ .............................................. H04B 3/46
[52] U.S. Cl. ........................................ 375/10; 375/7; 370/13
[58] Field of Search ................. 375/10, 36, 3.1; 370/13, 17, 24, 31, 32, 85.1

[56] References Cited

U.S. PATENT DOCUMENTS

| | | | |
|---|---|---|---|
| 4,965,795 | 10/1990 | Coffelt et al. | 370/13 |
| 4,989,202 | 1/1991 | Soto et al. | 370/13 |
| 4,998,240 | 3/1991 | Williams | 370/17 |
| 5,181,201 | 1/1993 | Schauss et al. | 370/85.1 |

Primary Examiner—Curtis Kuntz
Assistant Examiner—Don N. Vo

[57] ABSTRACT

A protocol analyzer pod for monitoring U-interface data streams in a communication system wherein full duplex U-interface line codes (such as AMI and 2B1Q) are used. The protocol analyzer pod is intrusively inserted (that is, inserted in series) in a U-interface line between a central office and a customer equipment. The protocol analyzer pod includes two cross-connected U-interface transceivers. According to the present invention, each end of the U-interface line is terminated into one of the U-interface transceivers. The two U-interface transceivers perform adaptive equalization and echo cancelling on their respective line segments. Also, the two U-interface transceivers separate the full duplex U-interface data stream on the U-interface line into separate input and output data streams. A protocol analyzer may monitor the full duplex U-interface data stream by monitoring the half duplex input and output data streams. It is understood that this technique could be used for line codes other than the AMI and 2B1Q discussed here.

18 Claims, 6 Drawing Sheets

PROTOCOL ANALYZER POD FOR THE ISDN U-INTERFACE

BACKGROUND OF THE INVENTION

1. Field of the Invention

The present invention relates generally to protocol analyzer pods, and more particularly to protocol analyzer pods for the Integrated Services Digital Network (ISDN) U-interface.

2. Related Art

The Integrated Services Digital Network (ISDN) has a number of access points, each with differing signals and data rates. A U-interface is one of these access points. The ISDN U-interface standard is described in a document entitled ANSI T1.601-1988, which is herein incorporated by reference in its entirety.

The U-interface is intended for use with an ISDN Basic Rate Access. The ISDN Basic Rate Access includes two 64 Kbit/S full duplex data channels (called B1 and B2) and one 16 Kbit/S full duplex control channel (called D). The two data and one control channels (abbreviated 2B+D) yield a rate of 144 Kbit/S full duplex for the ISDN Basic Rate Access. The two data and one control channels, plus 16 Kbit/S of overhead information, make up a 160 Kbit/S U-interface data stream.

The 160 Kbit/S U-interface data stream is sent and received full duplex over unloaded standard telephone twisted pair up to 18,000 feet. To reliably send and receive data at this rate over standard telephone twisted pair requires very complex U-interface transceivers. These U-interface transceivers use complex digital signal processing algorithms for adaptive equalization and digital echo cancelling techniques. A number of modulation/demodulation schemes are used. These modulation/demodulation schemes are called line codes. The line code most common in America today is called AMI (Alternate Mark Inversion). However, the standard that most operating companies are moving to is called 2B1Q (2-Binary-1-Quaternary). The 2B1Q line code is also called the ANSI line code. U-interface transceivers have been built for both of these line codes as well as others.

There are problems involved with monitoring a U-interface line wherein U-interface line codes (such as AMI and 2B1Q) that send and receive full-duplex are being used. First, a first signal that is being sent in one direction can be received only if a second signal that is being sent in the opposite direction is known. This is true in both directions. Second, adaptive equalization cannot be performed over the entire U-interface line. Rather, adaptive equalization is effective only at one point on the U-interface line. Therefore, in the general case, the U-interface line cannot be monitored without knowledge of the data on the U-interface line.

A prior solution to this problem involves making assumptions regarding the data on the U-interface line. However, such assumptions can be made only in special situations. This prior solution is very restrictive and cannot be guaranteed for all situations.

Therefore, a system and method is required for monitoring U-interface data streams in a communication system wherein full duplex U-interface line codes (such as AMI and 2B1Q) are used.

SUMMARY OF THE INVENTION

The present invention is directed to a system and method for monitoring U-interface data streams in a communication system wherein full duplex U-interface line codes (such as AMI and 2B1Q) are used.

Specifically, the present invention is directed to a protocol analyzer pod which is intrusively inserted (that is, inserted in series) in a U-interface line between a central office and a customer equipment. The protocol analyzer pod includes two U-interface transceivers. According to the present invention, each end of the U-interface line is terminated into one of the U-interface transceivers.

The two U-interface transceivers perform adaptive equalization and echo cancelling on their respective line segments. Also, the two U-interface transceivers separate the full duplex U-interface data stream on the U-interface line into separate input and output data streams. Thus, the U-interface transceivers represent 2-wire to 4-wire U-interface converters. A protocol analyzer may monitor the full duplex U-interface data stream by monitoring the half duplex input and output data streams.

The U-interface transceivers are cross-connected such that the data output of one of the U-interface transceivers feeds into the data input of the other U-interface transceiver. Thus, with regard to the full duplex U-interface data stream flowing between the central office and the customer equipment, the protocol analyzer pod operates as a U-interface repeater.

According to a first embodiment of the present invention, the protocol analyzer pod operates according to an AMI line code standard. According to a second embodiment of the present invention, the protocol analyzer pod operates according to a 2B1Q line code standard.

Further features and advantages of the present invention, as well as the structure and operation of various embodiments of the present invention, are described in detail below with reference to the accompanying drawings, and in the claims. In the drawings, like reference numbers indicate identical or functionally similar elements.

BRIEF DESCRIPTION OF THE DRAWINGS

The present invention will be described with reference to the accompanying drawings, wherein.

DETAILED DESCRIPTION OF THE PREFERRED EMBODIMENTS

A first embodiment of the present invention involves a system and method for monitoring U-interface lines wherein the AMI line code is used. A second embodiment of the present invention involves a system and method for monitoring U-interface lines wherein the 2B1Q line code is used. The first and second embodiments of the present invention are discussed below.

FIRST EMBODIMENT OF THE PRESENT INVENTION

Figure 1:
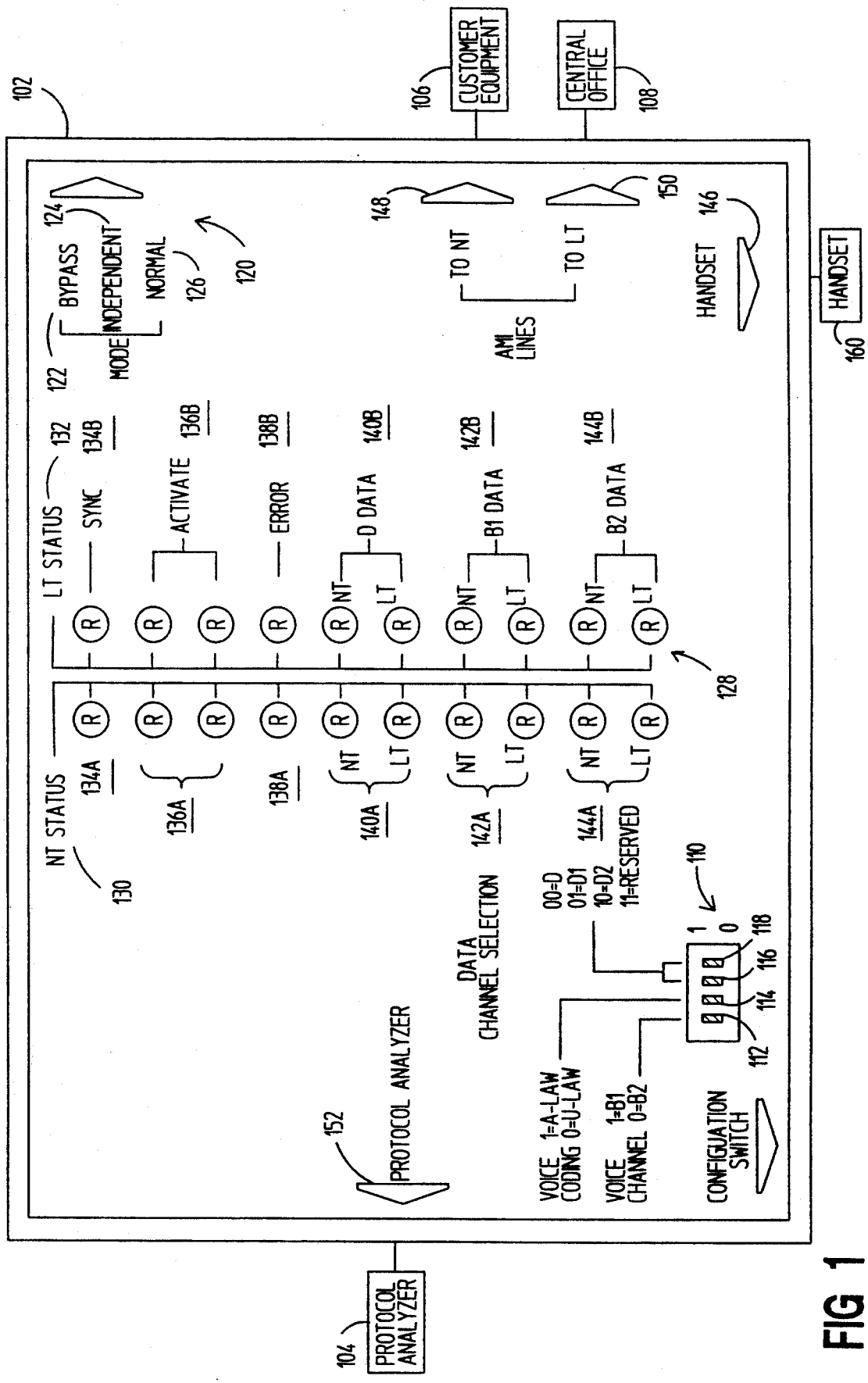
FIG. 1 illustrates a front panel of a protocol analyzer pod according to a first embodiment of the present invention.
Figure 3A:
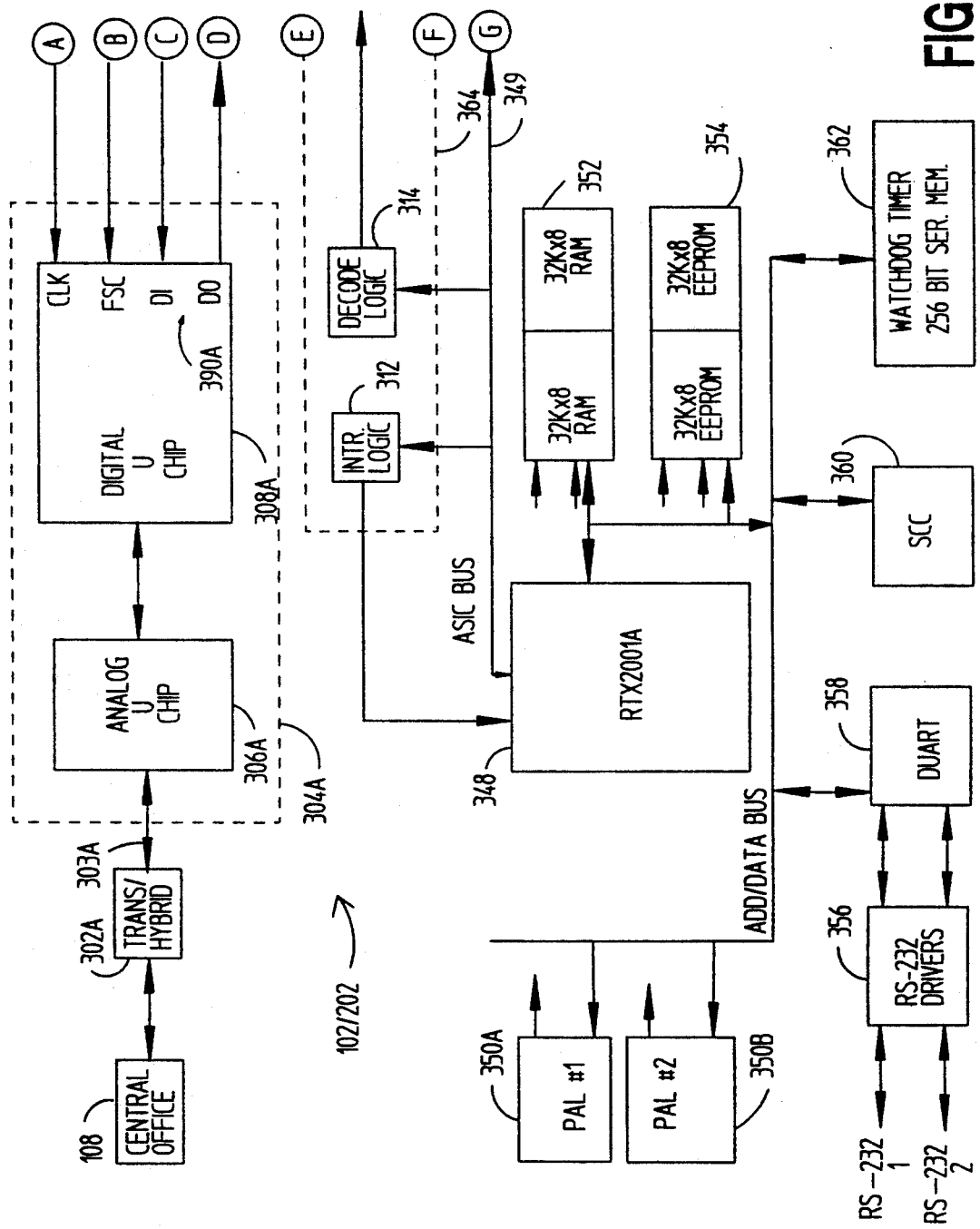
FIGS. 3A, 3B, and 3C collectively illustrate a block diagram of a protocol analyzer pod of the present invention.
Figure 3B:
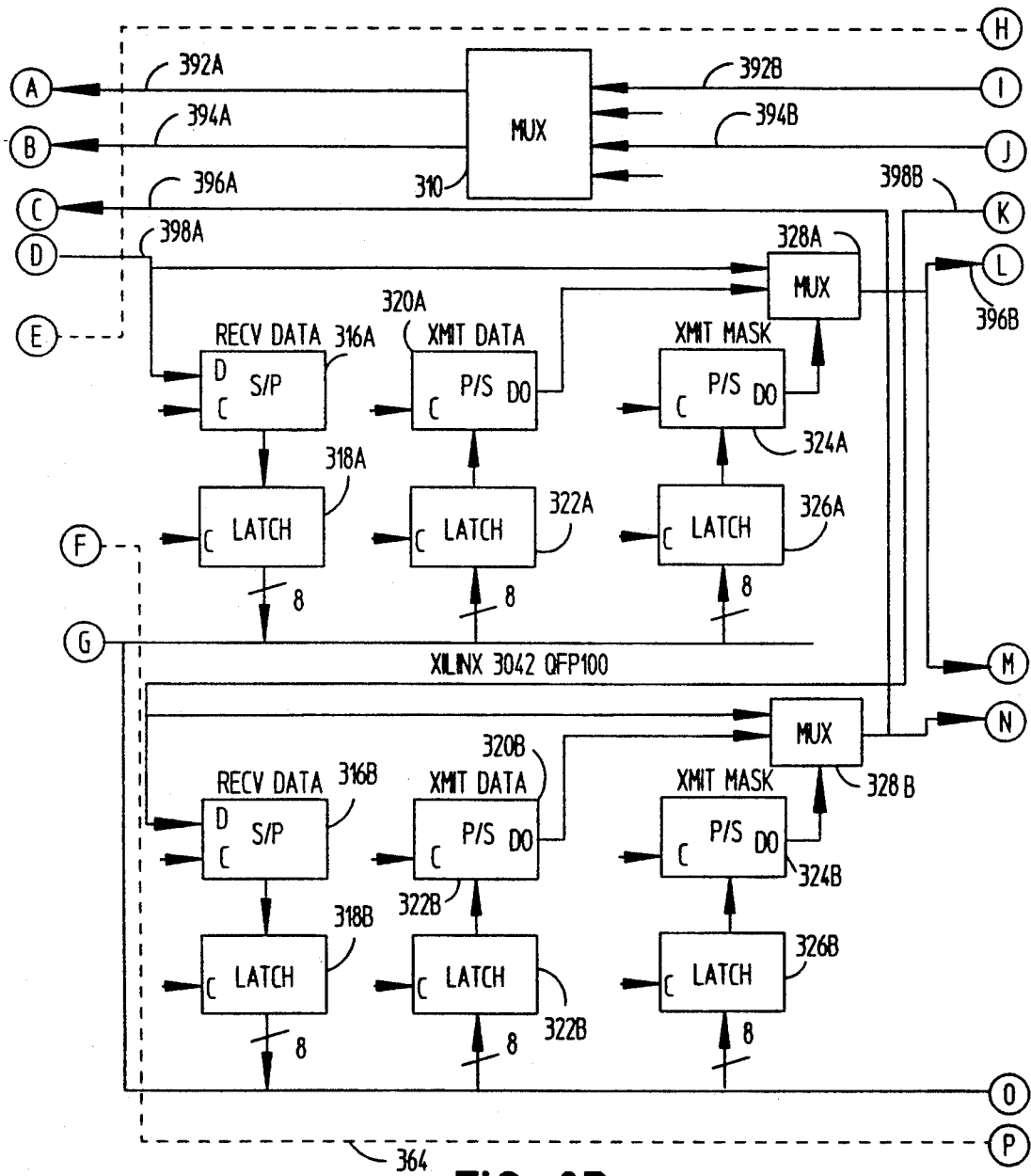
Figure 3C:
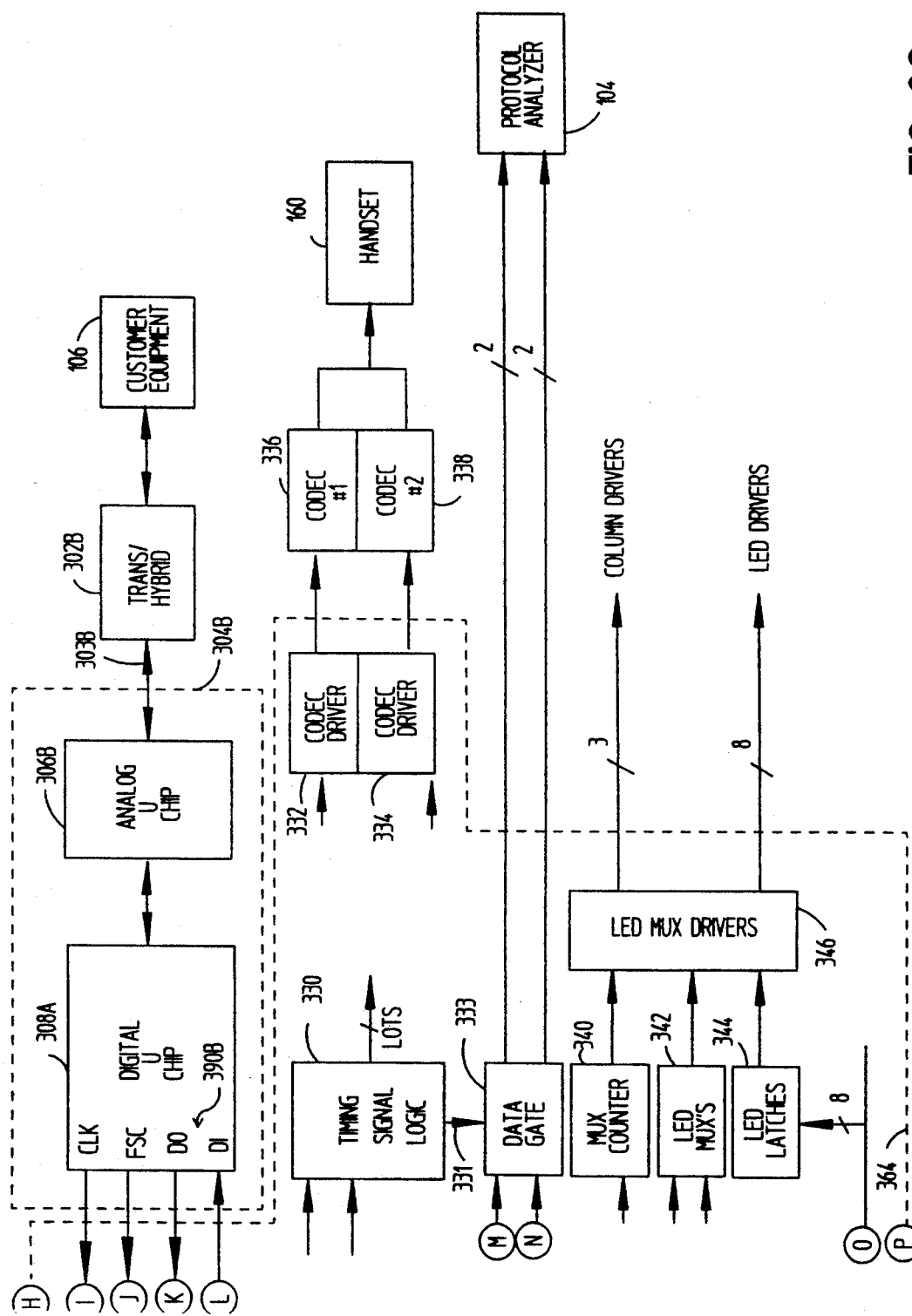

The first embodiment of the present invention represents a protocol analyzer pod 102 for use with U-interface lines wherein the AMI line code is used. The protocol analyzer pod 102 is generally described below with reference to FIGS. 1 and 3. FIG. 1 illustrates a front panel of the protocol analyzer pod 102. FIGS. 3A, 3B, and 3C collectively illustrate a block diagram of the protocol analyzer pod 102.

The protocol analyzer pod 102 includes two, 2-wire to 4-wire, AMI, U-interface transceivers 304. The U-interface transceivers 304 are cross-connected to form a U-interface repeater having a 4-wire interface 390 for the AMI line code. The Basic Rate signals (that is, B1, B2 and D) are available at the 4-wire interface 390 and are selectively fed to a protocol analyzer 104 for monitoring. The protocol analyzer pod 102 is obtrusively inserted (that is, inserted in series) in the U-interface line under test between a customer equipment 106 and a central office 108. After the customer 106 and the central office 108 have been activated, the Basic Rate signals are available from the protocol analyzer pod 102 for protocol analysis by the protocol analyzer 104.

The protocol analyzer pod 102 according to the first embodiment of the present invention is further described in the following sections.

1.1. AMI Overview

The AMI line code is well known in the art. The AMI line code is described in a document entitled AT&T 5D5-900-301 (September 1985, Part IIB), which is herein incorporated by reference in its entirety. Selected features of the AMI line code are summarized in this section.

An U-interface operating according to the AMI line code (hereinafter called an AMI U-interface) sends and receives data full-duplex at 160 KBits/S on one twisted pair. The AMI line code has a range of 13,000 feet with a bit-error-rate (BER) of 10E-6.

A transmission block of the AMI U-interface is called a basic frame. The basic frame contains 20 bits. The basic frame includes 8 bits each for the two B-channels (that is, B1 and B2), two bits for the D-channel and 1 bit each for framing and network control. The framing and network control bits are collectively called an N-channel. Twelve consecutive basic frames form an N-channel frame.

The N-channels in an N-channel frame form an N-frame. The N-frame is used for control and monitoring of the U-interface and to send messages across the link.

Eight consecutive N-channel frames form an AMI U-interface superframe.

Note the AMI line code gives no bandwidth reduction. The 160K Bits/Sec signals require 160 KHz bandwidth.

1.2. Front Panel Controls

Front panel controls for the protocol analyzer pod 102 according to the first embodiment of the present invention are described in this section with reference to FIG. 1.

A four gang, dip configuration switch 110 selects several operating options. A first switch 112 selects the ISDN B channel that drives the handset; 1=B1 and 0=B2. A second switch 114 selects the compression curve for codecs 336, 338; 1=A-Law and 0=u-Law. A-Law and u-Law are well known in the art. Switches 116, 118 select the source of the signal that is fed to the protocol analyzer 104; 00=D, 01=B1, 10=B2 and 11 is reserved for future use.

A three-position slide switch 120 selects one of three operational modes of the protocol analyzer pod 102. When the switch 120 is in a "Bypass" position 122, the protocol analyzer pod 102 is disconnected from the line and the respective Tip's and Ring's are shorted and the pod is electrically disconnected from the line.

When the switch 120 is in an "Independent" position 124, the customer equipment 106 and central office 108 independently activate. Activation is discussed below. The independent position facilitates isolation of level 1 (that is, physical link layer) problems to either the customer equipment 106 or the central office 108.

When the switch 120 is in a "Normal" position 126, the protocol analyzer pod 102 is connected in series with the line under test (between the customer equipment 106 and central office 108) and functions as a repeater. This is the only mode that will allow data to be monitored by the protocol analyzer 104.

1.3. Front Panel Indicators

The protocol analyzer pod 102 contains light emitting diodes (LED) 128. This section describes the LEDs 128.

The LEDs 128 are arranged in two columns 130, 132. A network termination (NT) column 130 shows the status of the U-interface link between the protocol analyzer pod 102 and the customer equipment 106. A line termination (LT) column 132 shows the status of the U-interface link between the protocol analyzer pod 102 and the central office 108.

The first row of LEDs 134 shows the state of the Frame Sync signal 394. If the NT Status Sync LED 134A is lit, the NT side of the repeater has achieved Frame Sync. Correspondingly, when the LT Status Sync LED 134B is lit, the LT side of the repeater has achieved Frame Sync.

The next two rows of LEDs 136 indicate the activation status of the U-interface line that the protocol analyzer pod 102 is testing. The NT side 136A indicates the activation status of the line between the protocol analyzer pod 102 and the customer equipment 106. The LT side 136B indicates the activation status of the line between protocol analyzer pod 102 and the central office 108. Activation is discussed further in the following section.

The next row of LEDs 138 indicate that an error was received in the last basic frame. The NT Status Error LED 138A corresponds to a mO bit of the link between protocol analyzer pod 102 and the customer equipment 106. The LT Status Error LED 138B indicates the state of the mO bit in the link between protocol analyzer pod 102 and the central office 108.

The last six rows of LEDs 140, 142, 144 are the data state indicators for the D, B1 and B2 channels respectively. NT rows indicate data from the NT, that is, data flowing from the customer equipment 106 to the central office 108. LT rows indicate data afrom the LT, that is, data flowing from the central office 108 to the customer equipment 106.

In the Independent mode 124, the data on the LT and NT sides is independent and the LEDs of the LT and NT sides 140, 142, 144 show no correlation. In the Normal mode 126, the NT NT and the LT NT LEDs show the same data because the data is "repeated" from NT NT to LT NT by the protocol analyzer pod 102. Additionally, data is "repeated" in the other direction, from LT LT to NT LT by the protocol analyzer pod 102. Consequently, the LT LT and the NT LT LEDs show the same data.

The D Data 140, B1 Data 142, and B2 Data 144 LEDs all behave in the same manner. That is, the LEDs 140, 142, 144 are lit when the respective data is a Mark.

1.4. Activation

When the protocol analyzer pod 102 is inserted in series in a U-interface line, the U-interface transceivers in the central office, the customer equipment, and both sides of the protocol analyzer pod 102 must be trained to the U-interface line. This is called activation. Activation must occur before data can be transferred in either direction, or any monitoring of data performed.

Activation according to the AMI line code (hereinafter called AMI activation) is well known in the art. AMI activation is described in AT&T 5D5-900-301 (September 1985, Part IIB), which was herein incorporated by reference in its entirety above.

This section describes interactions between the protocol analyzer pod 102 and the U-interface transceivers at the central office 108 and the customer equipment 108 to achieve AMI activation.

When the LT side of the protocol analyzer pod 102 receives an activate request from the central office 108, it turns on the stop LT Status Activate LED and passes the activation request to the NT side of the protocol analyzer pod 102. The NT side of the protocol analyzer pod 102, in turn, passes the activate request on to the customer equipment 106 and turns on the top NT Status Activate LED.

After the customer equipment 106 receives the activate request from the NT side of the protocol analyzer pod 102, it responds with an activate acknowledge back to the NT side of the protocol analyzer pod 102. When the activate acknowledge is received by the NT side of the protocol analyzer pod 102, the protocol analyzer pod 102 turns off the top NT Status Activate LED and turns on the bottom NT Status Activate LED. It also passes the activate acknowledge signal, received from the customer equipment 106, to the LT side of the protocol analyzer pod 102. The LT side of the protocol analyzer pod 102, in turn, passes the activate acknowledge to the central office 108. The LT side of the protocol analyzer pod 102 also turns off the top LT Status Activate LED and turns on the bottom LT Status LED.

The central office 108, upon receipt of the activate acknowledge, sends an activated signal to the LT side of the protocol analyzer pod 102. When the LT side of the protocol analyzer pod 102 receives the activated signal, it turns on both the top and bottom LT Status Activate LEDs. It then passes the activated signal to the NT side of the protocol analyzer pod 102. The NT side of the protocol analyzer pod 102 passes the activated signal on to the customer equipment 106.

The customer equipment 106, receiving the activated signal from the NT side of the protocol analyzer pod 102, responds with an activated signal back to the NT side of the protocol analyzer pod 102. When the NT side of the protocol analyzer pod 102 receives the activated signal from the customer equipment 106, it turns on both the top and bottom NT Status Activate LEDs indicating that the line between the protocol analyzer pod 102 and the customer equipment 106 is fully activated. The NT side of the protocol analyzer pod 102 also passes the activated signal, received from the customer equipment 106, on to the LT side of the protocol analyzer pod 102.

Finally, when the LT side of the protocol analyzer pod 102 gets the activated signal from the NT side, it passes it on to the central office 108. The line between protocol analyzer pod 102 and the central office is fully activated and the process is complete.

2. SECOND EMBODIMENT OF THE PRESENT INVENTION

Figure 2:
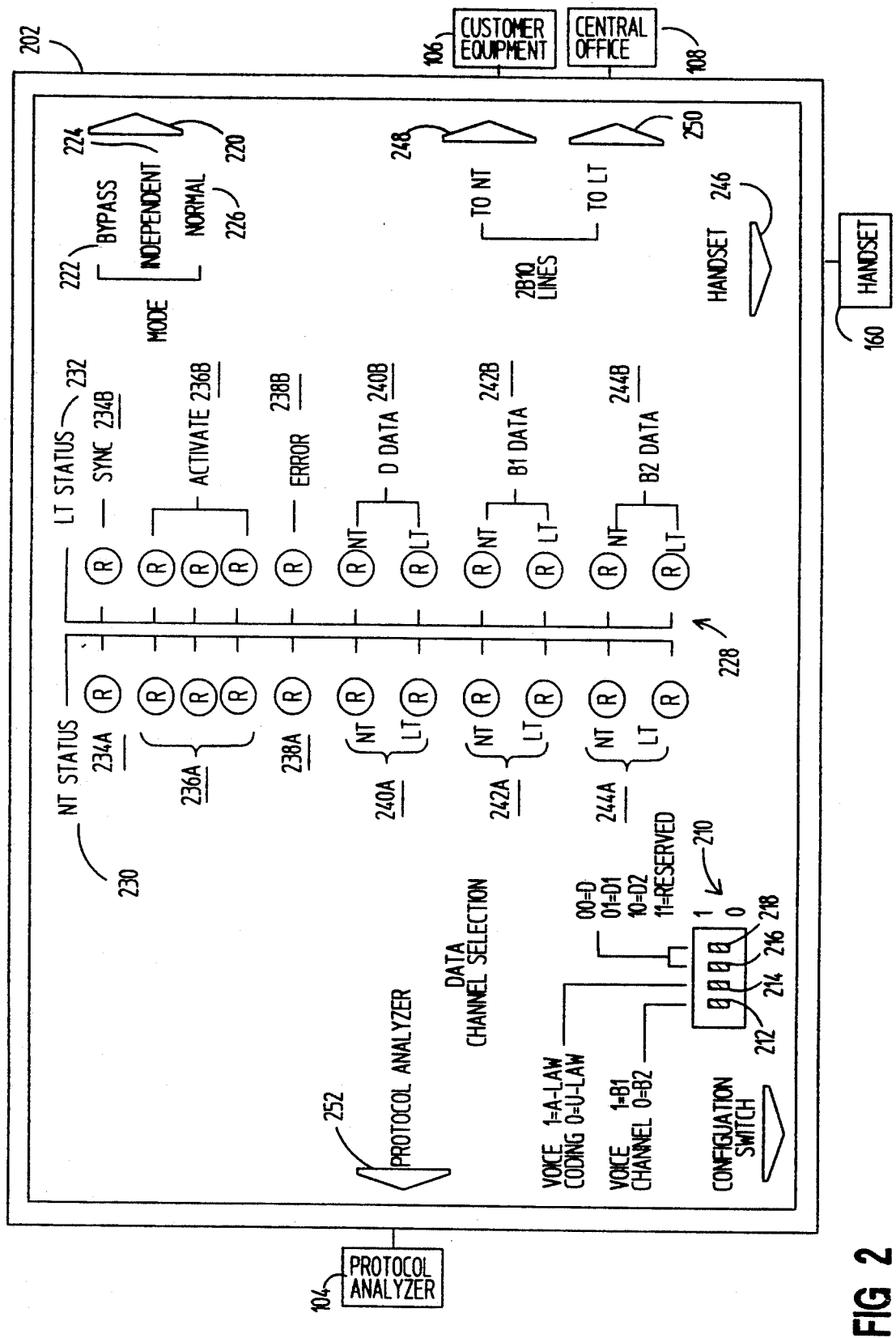
FIG. 2 illustrates a front panel of a protocol analyzer pod according to a second embodiment of the present invention.

The second embodiment of the present invention represents a protocol analyzer pod 202 for use with U-interface lines wherein the 2B1Q line code is used. The protocol analyzer pod 102 is generally described below with reference to FIGS. 2, 3A, 3B, and 3C. FIG. 2 illustrates a front panel of the protocol analyzer pod 202. FIGS. 3A, 3B, and 3C collectively illustrate a block diagram of the protocol analyzer pod 202.

The protocol analyzer pod 202 according to the second embodiment of the present invention is similar in concept and operation to the protocol analyzer pod 102 according to the first embodiment of the present invention, but with the 2B1Q line code.

The protocol analyzer pod 202 contains two, 2-wire to 4-wire, 2B1Q, U-interface transceivers 304. The U-interface transceivers 304 are cross-connected to form a U-interface repeater having a 4-wire interface 390. The individual Basic Rate signals (that is, B1, B2 and D) are available at the 4-wire interface 390 and are selectively fed to the protocol analyzer 104 for monitoring. In addition, a 4 KHz Maintenance Channel and Embedded Operations Channel (EOC) messages are available at the 4-wire interface 390.

The protocol analyzer pod 202 is obtrusively inserted (that is, inserted in series) in the U-interface line under test between the customer equipment 106 and the central office 108. After both the customer equipment 106 and central office 108 have been activated, the Basic Rate signals are available from the protocol analyzer pod 202 for protocol analysis by the protocol analyzer 202.

The protocol analyzer pod 202 according to the second embodiment of the present invention is further described in the following sections.

2.1. 2B1Q Overview

The 2B1Q line code is well known in the art. The 2B1Q line code is described in ANSI T1.601-1988, which was herein incorporated by reference in its entirety above. Selected features of the 2B1Q line code are summarized in this section.

An U-interface operating according to the 2B1Q line code (hereinafter called a 2B1Q U-interface) sends and receives data at 160 KBits/S full duplex on a twisted pair. The 2B1Q line code has a range of 18,000 feet with a guaranteed bit-error-rate of 10E-7. The basic transmission block for the 2B1Q line code is called a U-frame. The U-frame is 240 bits in length, or 1.5 mS in duration. It consists of an 18 bit Synchronization Word, followed by 12 blocks of 2B+D data (216 bits), and then 6 Maintenance (M) bits. This makes up the 240 bit basic U-frame. The 2B1Q line code requires four-level encoding. Because of the four-level encoding, each baud sent on an U-interface line carries 2 bits of data. Thus, the 240 bit basic U-frame is sent as 120 quantinary bauds.

Eight basic U-frames are grouped to form an U-superframe. The U-superframes are delineated by the Synchronization Word being inverted. Both U-framing and U-superframing are done automatically by the U-interface transceivers. Once framing is achieved, the 2B+D data is transparent to the U-interface.

2.2. Front Panel Controls

As shown in FIG. 2, the protocol analyzer pod 202 includes a four gang, dip configuration switch 210, and a three-position slide switch 220. The switches 210, 220 for the protocol analyzer pod 202 operate in the same manner as the switches 110, 120 for the protocol analyzer pod 102.

2.3. Front Panel Indicators

The protocol analyzer pod 202 contains light emitting diodes (LED) 228. The operation of the LEDs 228 for the protocol analyzer pod 202 is analogous to the operation of the LEDs 128 for the protocol analyzer pod 102. This section describes the differences between the LEDs 228 for the protocol analyzer pod 202 and the LEDs 128 for the protocol analyzer pod 102.

The protocol analyzer pod 202 contains three rows of LEDs 236 which annunciated the activation status of the U-interface line which the protocol analyzer pod 202 is testing. These three rows of LEDs 236 are necessary since the 2B1Q line code has 13 distinct states associated with activation (in the preferred embodiment of the present invention, 7 are annunciated). The AMI line code has five annunciated states associated with activation. Activation for the 2B1Q line code is discussed in a section below.

The Error row of LEDs 238 indicate that a Far End Block Error was found in the previous U-frame on the respective NT or LT side.

Except for a few of the M bits, a CRC is calculated for all of the data in each U-superframe. This CRC is sent as data in the next U-superframe. The U-interface transceivers compare the transmitted CRC with one calculated on the received data to check for errors. If the two CRCs do not match an error has occurred.

If a U-interface transceiver receives a frame with a bad CRC, then an error has occurred. When this happens a FEBE bit is set to 0 in the next outgoing superframe and the indications is sent back to the originator. The FEBE bits can be monitored by the protocol analyzer pod 202 in both directions to determine the performance of the far end receiver.

2.4. Activation

Activation according to the 2B1Q line code (hereinafter called 2B1Q activation) is well known in the art. 2B1Q activation is described in ANSI T1.601-1988, which was herein incorporated by reference in its entirety above.

There are several differences between AMI activation and 2B1Q activation. With 2B1Q activation, either the customer equipment 106 or the central office 108 may initiate the activation process. With AMI activation, only the central office 108 may initiate the activation process.

The 2B1Q standard also defines a power-down mode. A U-interface line can be placed in the power-down mode by discontinuing all signals on the U-interface line after the U-interface line has successfully completed 2B1Q activation. Since both sides of the U-interface line have been trained (that is, their digital adaptive equalizer and echo canceler coefficients have been adjusted to match the physical line), the U-interface line can be activated very quickly, without going through the training process again (that is, without going through 2B1Q activation again). This activation from the power-down mode is called a "Warm Start".

Other than the differences described above, 2B1Q activation and AMI activation are conceptually very similar. Essentially, according to 2B1Q activation, both ends of an U-interface line handshake with analog calibration signals that the U-interface transceivers use to adjust their adaptive equalizer and echo canceler coefficients. After such adjustment is complete, digital signals are sent back and forth to allow phase-locked-loops to establish frame and data synchronization. Once frame and data synchronization have been achieved, synchronization on the 96 frame U-superframes is established and the U-interface line is fully activated.

The operation of the protocol analyzer pod 202 during 2B1Q activation is very similar to the operation of the protocol analyzer pod 102 during AMI activation. Thus, based on the above description of the operation of the protocol analyzer pod 102 during AMI activation, and since 2B1Q activation is well known in the art, the manner in which the protocol analyzer pod 202 operates during 2B1Q activation will be apparent to those skilled in the art.

BLOCK DIAGRAM OF THE PRESENT INVENTION

FIGS. 3A, 3B, and 3C collectively illustrate a block diagram of the protocol analyzer pod 102, 202 of the present invention. Unless stated otherwise, the following description of the block diagram shown in FIGS. 3A, 3B, and 3C applies to the protocol analyzer pod 102 according to the first embodiment of the present invention and the protocol analyzer pod 202 according to the second embodiment of the present invention. The protocol analyzer pod 102, 202 may be implemented using readily available components.

The protocol analyzer pod 102, 202 is inserted in series in an U-interface link between the central office 108 and customer equipment 106. The protocol analyzer pod 102, 202 includes transformer/hybrids (trans/hybrid) 302 which physically and electrically couple twisted pair wire (connected to the central office 108 and customer equipment 106) to analog U chips 306 in the protocol analyzer pod 102, 202.

The protocol analyzer pod 102, 202 also includes U-interface transceivers 304. Each U-interface transceiver 304 includes an analog U chip 306 and a digital U chip 308. In the first embodiment of the present invention, the analog U chip 306 is an American Telegraph & Telephone (ATT) T7260. The digital U chip 308 is an ATT T7261. In the second embodiment of the present invention, the analog U chip 306 is an ATT T7262. The digital U chip 308 is an ATT T7263. In an alternate embodiment, each U-interface transceiver 304 may be implemented using single chips.

The protocol analyzer pod 102, 202 includes interrupt logic 312, decode logic 314, serial/parallel converters 316, parallel/serial converters 320, multiplexers (MUX) 310, 328, latches 318, 322, 326, timing signal logic 330, codec drivers 332, 334, a MUX counter 340, LED MUXs 342, LED latches 344, and LED MUX drivers 346. According to a preferred embodiment of the present invention, the components identified above in this paragraph are implemented using a "Xilinx" 3042 QFP100 field programmable block 364. However, these components may be implemented using any equivalent available components.

The MUX counter 340, LED MUXs 342, LED latches 344, and LED MUX drivers 346 are used to drive the LEDs 128, 228.

The protocol analyzer pod 102, 202 further includes a bus 349, programmable array logic 350, random access memory (RAM) 352, electrically erasable programmable read only memory (EEPROM) 354, RS-232 drivers 356, a dual universal asynchronous receiver/transmitter (DUART) 358, a serial communication controller (SCC) 360, a watchdog timer 362, coders/decoders (codecs) 336, 338, and a processor 348. In the preferred embodiment of the present invention, the processor 348 is a RTX2001 processor.

The codec drivers 332, 334 and codecs 336, 338 are used to drive the handset 160.

The RS-232 drivers 356 and DUART 358 are used to load and modify programs in the EEPROM 354.

The SCC 360 is a sophisticated UART which supports both synchronous and asynchronous communication. The SCC 360 may be used with the protocol analyzer 104 to analyze level 2 and above data on the D channel or either B channel. The SCC 360 may be used to receive data from the protocol analyzer 104 and to transmit the data to the customer 106 and/or central office 108. Thus, the SCC 360 may be used to convert the protocol analyzer pod 102, 202 from a monitoring device to one that can send data as well.

The watchdog timer 362 is used to monitor the operation of the processor 348. The watchdog timer 362 includes a counter. Periodically, the processor 348 must reset the counter. If the processor 348 does not reset the counter (due to a processing error, for example), and the counter reaches a predefined limit, then the watchdog timer 362 resets the processor 348. Thus, the watchdog timer 362 limits processing errors.

The watchdog timer block 362 also includes 256 bits of non-volatile memory to store configuration information. The configuration information is used to determine the processing state before resetting the processor 348.

Each U-interface transceiver 304 has a clock (CLK) 392, frame synchronization (FSC) 394, data in (DI) 396, and data out (DO) 398. The DI 396 and DO 398 represent a 4-wire interface 390. Thus, the U-interface transceivers 304 represent 2-wire to 4-wire converters.

Note that the DO 398 of one U-interface transceiver 304 is connected to the DI 396 of the other U-interface transceiver 304. Thus, the U-interface transceivers 304 are cross-connected.

The U-interface transceivers 304 receive the U-interface data stream from the trans/hybrids 302. From the U-interface data stream, the U-interface transceivers 304 place clock and frame synchronization information on the CLK 392 and FSC 394, respectively. Also, the U-interface transceivers 304 perform adaptive equalization and echo cancelling, and separate the bidirectional signal from the twisted pair wire into separate input and output data streams, such that 2B+D data (and control information) are transmitted out the DO 398. According to the preferred embodiment of the present invention, the rate of the FSC 394 is 8 KHz. According to the first embodiment of the present invention, the rate of the CLK 392 is 256 Kbit/S. According to the second embodiment of the present invention, the rate of the CLK 392 is 512 Kbit/S.

As shown in FIGS. 3A, 3B, and 3C the 2B+D data (and control information) on the DO 398 of one U-interface transceiver 304 is sent to the DI 396 of the other U-interface transceiver 304. Thus, the cross-connected U-interface transceivers 304 form a U-interface repeater.

As noted above, 2B+D data (and control information) is present on the line going from the DO 398B of the U-interface transceiver 304B to the DI 396A of the U-interface transceiver 304A. Also, 2B+D data (and control information) is present on the line going from the DO 398A of the U-interface transceiver 304A to the DI 396B of the U-interface transceiver 304B. A protocol analyzer 104 may be connected to these lines in order to perform protocol analysis on the bidirectional 2B+D data (and control information). As shown in FIGS. 3A, 3B, and 3C, the protocol analyzer 104 is connected to a data gate 333 which receives input from both the DIs 396 and DOs 398. In the preferred embodiment of the present invention, the protocol analyzer 104 is a Hewlett-Packard (HP) 4951/52/57 protocol analyzer.

The protocol analyzer 104 receives the data streams flowing between the U-interface transceivers 304 in a serial fashion at a rate dictated by a clock 331. The clock 331 is produced by the timing signal logic 330. The timing signal logic 330 provides clock signals for most of the components shown in FIGS. 3A-3C (inputs having a "C" label indicate clock inputs). The clock 331 is synchronized to the time slots associated with B1, B2, and D. That is, if the protocol analyzer 104 is monitoring B1, then the clock 331 represents eight clock pulses during the 8-bit B1 time slot in each frame. If the protocol analyzer 104 is monitoring D, then the clock 331 represents two clock pulses during the 2-bit D time slot in each frame. Whether the clock 331 is synchronized to the B1, B2, or D time slot depends on the settings of switch 116, 216 and switch 118, 218, which select the source of the signal (that is, B1, B2, or D) that is fed to the protocol analyzer 104.

The processor 348 controls the operation of the protocol analyzer pod 102, 202 of the present invention. The processor 348 operates according to a computer program in the EEPROM 354. In the preferred embodiment of the present invention, the computer program is written in a Forth computer programming language.

According to the first embodiment of the present invention, the computer program implements a state machine associated with the AMI line code for the ISDN U interface. The state machine associated with the AMI line code for the ISDN U interface is well known in the art and is described in AT&T 5D5-900-301 (September 1985, Part IIB) which was herein incorporated by reference in its entirety above. Based on the discussion contained herein, and since the AMI line code for the ISDN U interface is well known in the art, the structure and operation of the computer program according to the second embodiment of the present invention will be apparent to those skilled in the art.

According to the second embodiment of the present invention, the computer program implements a state machine associated with the 2B1Q line code for the ISDN U interface. The state machine associated with the 2B1Q line code for the ISDN U interface is well known in the art and is described in ANSI T1.601-1988 which was herein incorporated by reference in its entirety above. Based on the discussion contained herein, and since the 2B1Q line code for the ISDN U interface is well known in the art, the structure and operation of the computer program according to the second embodiment of the present invention will be apparent to those skilled in the art.

As briefly described above, and as is well known in the art, during activation (that is, during the process whereby activation is achieved) the customer equipment 106 and the central office 108 exchange messages. If the protocol analyzer pod 102, 202 is in the normal mode 126, 226, then during activation the protocol analyzer pod 102, 202 acts as a repeater. As described above, the protocol analyzer pod 102, 202 also annunciates the progress of activation using the Activate LEDs 136, 236. If the protocol analyzer pod 102, 202 is in the independent mode 124, 224 while only one side is trying to activate (that is, only the central office 108 or the customer equipment 106 is trying to activate), then the protocol analyzer pod 102, 202 uses the multiplexer 310 to supply clock and frame synchronization signals to the side which is trying to activate.

Figure 4:
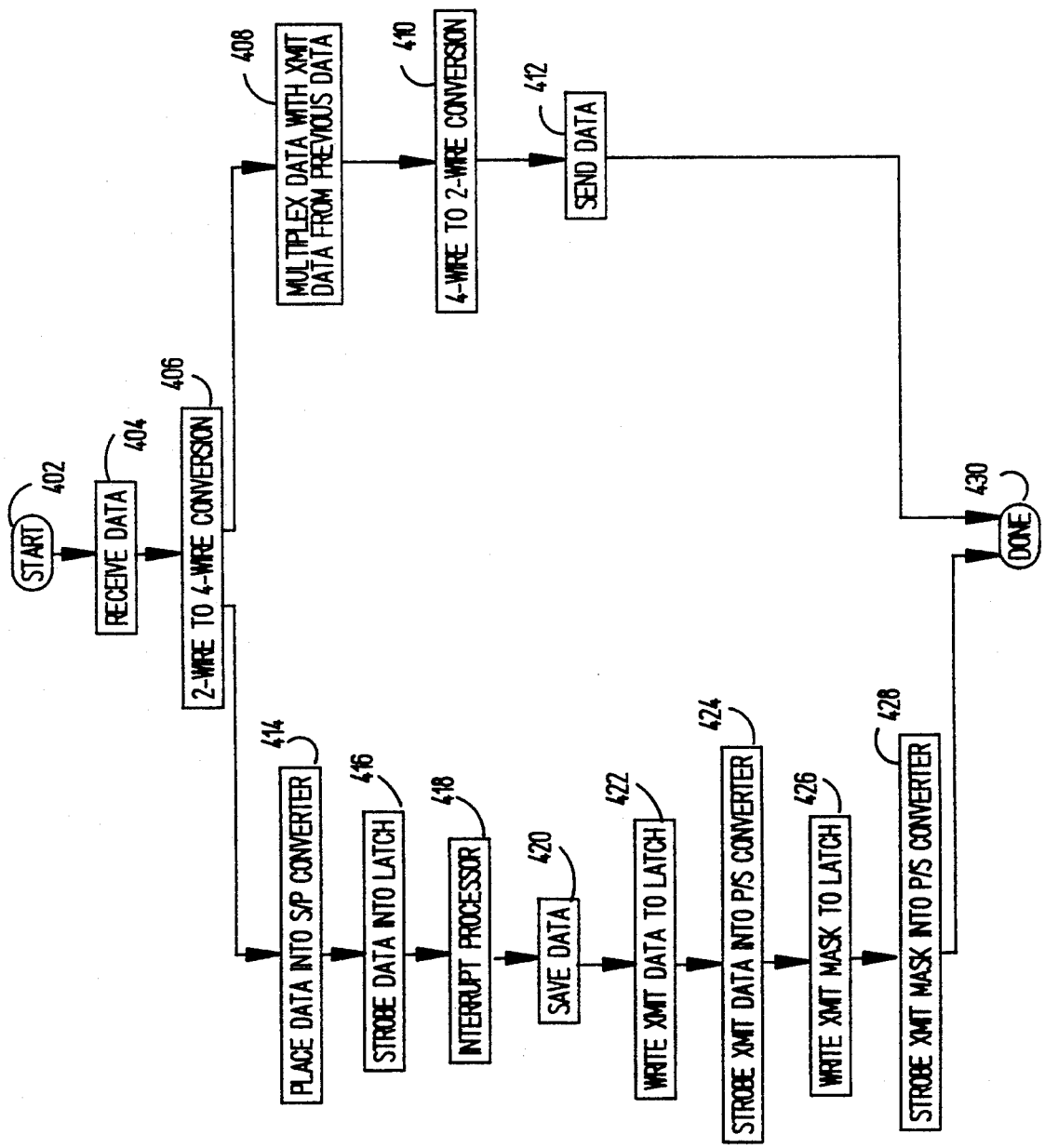
FIG. 4 illustrates the operation of a protocol analyzer pod of the present invention.

FIG. 4 illustrates the operation of the protocol analyzer pod 102, 202 after activation is achieved. As noted above, data streams flow through the protocol analyzer pod 102, 202. However, for illustrative purposes, FIG. 4 is described below with regard to a single byte being serially sent from the customer equipment 106 to the central office 108, wherein the single byte is part of the data stream that is flowing from the customer equipment 106 to the central office 108.

In step 404, the trans/hybrid 302B serially receives the byte from the twisted pair wire connected to the customer equipment 106. The trans/hybrid serially transfers the byte to the U-interface transceiver 304B on a full-duplex line 303B.

In step 406, the U-interface transceiver 304B performs 2-wire to 4-wire conversion whereby adaptive equalization and echo cancelling are performed. Also, the bidirectional signal from the twisted pair wire is separated into separate input and output data streams, such that the byte is received from the full-duplex line 303B and transmitted on the half-duplex line connected to DO 398B.

Steps 408 through 412 are performed in parallel with steps 414 through 428.

In step 408, the multiplexer 328B is used to multiplex the byte with xmit (transmit) data in the parallel/serial converter 320B. Multiplexing is controlled by a xmit mask in the parallel/serial converter 324B. Specifically, a bit in the byte is replaced by a corresponding bit in the xmit data if a corresponding bit in the xmit mask is set to 1. For example, suppose the byte is 1101 0011, the xmit data is 0100 0000, and the xmit mask is 1100 0000. The output of the multiplexer 328B would be 0101 0011.

The ability of the protocol analyzer pod 102, 202 to modify bits in the byte enables the protocol analyzer pod 102, 202 to affect the operation of the customer equipment 106 and the central office 108. For example, in step 408, the protocol analyzer pod 102, 202 may modify a control bit in the byte such that the central office 108 (upon receiving the byte) will take an action as specified by the control bit.

The xmit data and xmit mask used during step 408 were loaded into the parallel/serial converters 320, 324B during the processing of the previous byte. The processing of the current byte will load new xmit data and xmit mask values into the parallel/serial converters 320, 324B. These new xmit data and xmit mask values will be used during the processing of the next byte. The manner in which the parallel/serial converters 320B, 324B are loaded with the xmit data and xmit mask, respectively, is discussed below.

In step 410, the byte is serially transferred from the multiplexer 328B to the DI 396A of the U-interface transceiver 304A. The U-interface transceiver performs a 4-wire to 2-wire conversion whereby the byte is received from the half-duplex line connected to the DI 396A and transmitted on a full-duplex line 303A.

In step 412, the trans/hybrid 302A serially transmits the byte to the central office 108.

Steps 414 through 428 are now described. Recall that steps 414 through 428 are performed in parallel with steps 408 through 412.

In step 414, the byte is serially loaded into the serial/parallel converter 316B.

In step 416, after the byte has been completely loaded into the serial/parallel converter 316B, the interrupt logic 312 strobes the byte into the latch 318B.

In step 418, the interrupt logic 312 interrupts the processor 348 and informs the processor 348 that the byte is in the latch 318B.

In step 420, the processor 348 reads the byte from the latch 318B. Specifically, the processor 348 issues a read command wherein the address of the read command specifies the latch 318B. The decode logic 314 decodes the address of the read command and enables the latch 318B such that the latch 318B places the byte onto the bus 349. The decode logic 314 decodes the address according to memory map information in the PALs 350. The processor 348 receives the byte and stores the byte in the RAM 352. The processor 348 may use the byte while processing the state machines (associated with the AMI and 2B1Q line codes). The processor 348 may also use the byte while performing user-selectible functions, such as bit-error-rate testing and D channel emulation.

In step 422, the processor 348 writes a new xmit data value from the RAM 352 to the latch 322B. Specifically, the processor 348 issues a write command wherein the address of the write command specifies the latch 322B and the data of the write command contains the new xmit data value. The decode logic 314 decodes the address of the write command and enables the latch 322B such that the latch 322B accepts the new xmit data value from the bus 349.

In step 424, the interrupt logic 312 strobes the new xmit data value into the parallel/serial converter 320.

In step 426, the processor 348 writes a new xmit mask value from the RAM 352 to the latch 326B. Specifically, the processor 348 issues a write command wherein the address of the write command specifies the latch 326B and the data of the write command contains the new xmit mask value. The decode logic 314 decodes the address of the write command and enables the latch 326B such that the latch 326B accepts the new xmit mask value from the bus 349.

In step 428, the interrupt logic 312 strobes the new xmit mask value into the parallel/serial converter 324.

As noted above, the new xmit data and xmit mask values are used during the processing of the next byte. The processor 348 sends xmit data and xmit mask values to the parallel/serial converters 320, 324 in order to control the transceivers 304. In an alternate embodiment, however, the processor 348 may execute a D-channel emulator program such that the protocol analyzer pod 102/202 would send data on the D-channel. According to this alternate embodiment, the processor 348 would load xmit data and xmit mask values from the RAM 352 into the parallel/serial converters 320,324 in order to send data on the D-channel.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a communication system having a first site and a second site which communicate via a full duplex twisted pair wire according to an Integrated Services Digital Network (ISDN) U-interface standard, wherein said twisted pair wire has a first end coupled to a second end and to the first site, and a third end coupled to a fourth end and to the second site, an apparatus for enabling a protocol analyzer to monitor U-interface data streams on the twisted pair wire, said apparatus comprising:

(1) first transceiver means, coupled to the second end, comprising a first data-in port and a first data-out port;

(2) second transceiver means, coupled to the fourth end, comprising a second data-in port and a second data-out port, wherein said first data-out port is coupled to said second data-in port and said second data-out port is coupled to said first data-in port;

wherein said first and second transceiver means separate the U-interface data streams into separate input and output data streams, such that a first data stream received by said first transceiver means is transmitted out said first data-out port, and a second data stream received by said second transceiver means is transmitted out said second data-out port; and wherein the protocol analyzer is coupled to said first data-out port and said second data-out port or said first data-in port and said second data-in port.

2. The apparatus of claim 1, further comprising:

(3) first receive latch means, coupled to said first data-out port, for storing said first data streams from said first data-out port;

(4) second receive latch means, coupled to said second data-out port, for storing said second data streams from said second data-out port; and (5) means for transferring said first data streams and second data streams from said first receive latch means and second receive latch means, respectively, to means for receiving said transferred first and second data streams, and for performing predetermined communication functions using said received first and second data streams.

3. The apparatus of claim 1, further comprising:

(3) first multiplexer means, coupled to said first data-in port, for storing a first transmit data and a first transmit mask;

(4) second multiplexer means, coupled to said second data-in port, for storing a second transmit data and a second transmit mask; and (5) means for multiplexing said first transmit data with said second data streams and said second transmit data with said first data streams according to said first transmit mask and second transmit mask, respectively.

4. In a communication system having a first site and a second site which communicate via a full duplex twisted pair wire according to an Integrated Services Digital Network (ISDN) U-interface standard, wherein said twisted pair wire has a first end coupled to a second end and to the first site, and a third end coupled to a fourth end and to the second site, an apparatus for enabling a protocol analyzer to monitor U-interface data streams on the twisted pair wire, said apparatus comprising:

(1) first transceiver means, coupled to the second end, comprising a first data-in port and a first data-out port;

(2) second transceiver means, coupled to the fourth end, comprising a second data-in port and a second data-out port, wherein said first data-out port is coupled to said second data-in port and said second data-out port is coupled to said first data-in port;

(3) first receive latch means, coupled to said first data-out port, for storing first data streams from said first data-out port;

(4) second receive latch means, coupled to said second data-out port, for storing second data streams from said second data-out port;

(5) means for transferring said first data streams and second data streams from said first receive latch means and second receive latch means, respectively, to means for receiving said transferred first and second data streams, and for performing predetermined communication functions using said received first and second data streams;

(6) first multiplexer means, coupled to said first data-in port, for storing a first transmit data and a first transmit mask;

(7) second multiplexer means, coupled to said second data-in port, for storing a second transmit data and a second transmit mask; and (8) means for multiplexing said first transmit data with said second data streams and said second transmit data with said first data streams according to said first transmit mask and second transmit mask, respectively;

wherein said first and second transceiver means separate the U-interface data streams into separate input and output data streams, such that said first data stream received by said first transceiver means is transmitted out said first data-out port, and said second data stream received by said second transceiver means is transmitted out said second data-out port; and wherein the protocol analyzer is coupled to said first data-out port and said second data-out port or said first data-in port and said second data-in port.

5. The apparatus of claim 4, further comprising:

(9) bus means; and

(10) processing means, coupled to said bus means, for controlling said apparatus.

6. The apparatus of claim 5, wherein said first receive latch means comprises:

serial/parallel conversion means, coupled to said first data-out port, for serially receiving said first data streams from said first data-out port; and latch means, coupled to said serial/parallel conversion means and said bus means.

7. The apparatus of claim 6, wherein said means for transferring comprises interrupt logic means having:

means for transferring in parallel said first data streams from said serial/parallel conversion means to said latch means; and means for causing said processor to transfer said first data streams from said latch means to said memory means.

8. The apparatus of claim 5, wherein said first multiplexer means comprises:

transmit data latch means for storing said first transmit data;

transmit mask latch means for storing said first transmit mask; and a multiplexer coupled to said first data-in port, said transmit data latch means, and said transmit mask latch means.

9. The apparatus of claim 8, wherein said means for multiplexing comprises means for replacing bits in said second data streams with corresponding bits in said first transmit data when corresponding bits in said first transmit mask are enabled.

10. The apparatus of claim 9, further comprising interrupt logic means for causing said processor to transfer said first transmit data and transmit mask to said transmit data latch means and transmit mask latch means, respectively.

11. The apparatus of claim 4, wherein said processing means operates according to an Alternate Mark Inversion (AMI) line code standard.

12. The apparatus of claim 4, wherein said processing means operates according to a 2-Binary-1-Quaternary (2B1Q) line code standard.

13. In a communication system having a first site and a second site which communicate via a full duplex twisted pair wire according to an Integrated Services Digital Network (ISDN) U-interface standard, wherein said twisted pair wire is coupled to the first site and second site, a method for monitoring full duplex U-interface data streams on the twisted pair wire, said method comprising the steps of:

(a) tapping into the twisted pair wire such that the twisted pair wire has a first end coupled to the first site and a second end coupled to the second site;

(b) receiving said full duplex data streams from said first end;

(c) separating said full duplex data streams into separate half duplex input and output data streams;

(d) monitoring said half duplex input and output data streams;

(e) combining said half duplex input and output data streams into said full duplex data streams; and (f) sending said full duplex data streams to said second end.

14. The method of claim 13, further comprising the steps of:

(g) serially placing said output data streams in a serial/parallel converter;

(h) transferring in parallel said output data streams from said serial/parallel converter to a latch; and (i) transferring said output data streams from said latch to a memory.

15. The method of claim 14, further comprising the step of using said output data streams stored in said memory to perform protocol analysis operations.

16. The method of claim 13, further comprising the step of:

(g) replacing bits in said output data streams with corresponding bits in a first transmit data when corresponding bits in a first transmit mask are enabled;

wherein step (g) occurs before steps (e) and (f).

17. The method of claim 13, wherein said first and second sites communicate according to an Alternate Mark Inversion (AMI) line code standard.

18. The method of claim 13, wherein said first and second sites communicate according to a 2-Binary-1-Quaternary (2B1Q) line code standard.

* * * * *